3,846,098
MANUFACTURE OF A WHITE PORCELAIN BODY OF HIGH TRANSLUCENCY AND HIGH STRENGTH
Tsuyoshi Nakashima, Nagoya, and Tsutomu Shibata, Hashima, Japan, assignors to Nippon Toki Kabushiki Kaisha, Nagoya, Japan
Continuation-in-part of abandoned application Ser. No. 16,969, Mar. 5, 1970. This application Mar. 10, 1972, Ser. No. 233,440
Claims priority, application Japan, Mar. 10, 1969, 44/18,214
Int. Cl. C03b 23/20, 29/00
U.S. Cl. 65—18        4 Claims

ABSTRACT OF THE DISCLOSURE

A hard porcelain body utilizing a sintered compound of enstatite phases as its chief ingredient, and its manufacturing method.

The present invention relates to a hard porcelain body of high white translucency and high mechanical strength and a method for its manufacture wherein, by sintering MgO or Mg compounds with $SiO_2$ at a high temperature, a sintered compound comprising enstatite phases is formed, then, employing the said sintered compound as the chief ingredient, a plastic clay is added thereto and pulverized and mixed with a plastic green body and, then by subjecting the said plastic green body to the well-known process of screening, forming, finishing, drying, biscuit firing, glazing and glost firing, the said hard porcelain body is obtained by depositing in a great quantity fine crystalline phases of cordierite, enstatite and forsterite in a hard porcelain product.

Incidentally, the term for a biscuit firing means a low temperature firing in order to perform an easy glazing after a green body is made insoluble and is given water absorption making its strength somewhat greater. Glazing means a process for application of a glaze on a green body surface of a hard porcelain. The definition for Gaerome clay and Murakami clay, though these terms appear in this Specification afterwards, shall be also given herein beforehand. Namely, Gaerome clay is a Japanese word in its origin, but it is a technical term generally designating a clay formed by a change in the nature of granite. Murakami clay is also a Japanese word in its origin and it is derived from the name of the locality in Japan called Murakami in which it was produced, but this clay contains, in general, sericite and quartz as its chief ingredients, and occurs by hydrothermal alteration from quartz trachyte. It is sticky when wet, but it has low plasticity and good orientation property.

These terms for biscuit firing, glazing, glaze, Gaerome clay and Murakami clay shall be employed hereafter throughout this specification with the definitions stated heretofore.

RELATED APPLICATION

The present application is a continuation-in-part application for Ser. No. 16,969 filed by the application on Mar. 5, 1970, now abandoned.

BACKGROUND OF INVENTION

The present invention relates chiefly to the formation of a hard porcelain body of high white translucency and high strength tablewares and also to a method for its manufacture. As to a prior art in general for improving the invention of this kind which has been known formerly, the manufacture method for glass ceramics called Pyrocerams (trade name) developed by Corning Glass Works Co. in U.S.A. became famous for as the radome material of missiles in connection with the space development project, however, there is an example for a further improvement for such manufacturing as above, e.g. U.S. Pat. No. 3,170,780. This method is a manufacturing method for glass ceramics obtained by crystallization of glass which contains zinc sulphide. If further explained in detail, this manufacturing method consists of two methods, namely, the one of them is a method such that instead of expensive lithium oxide cheap zinc sulphide or zinc oxide and sulfur are mixed with glass materials and melted at the temperature lower than the decomposing temperature of ZnS and, then, after forming in a definite shape, it is subjected to a heat treatment at 900° C.–1,000° C. so as to produce crystallized glass ceramics from glass, and the other method is a manufacturing method such that instead of glass materials blast furnace clinkers are employed and, by undergoing the same method stated above, a hard porcelain of crystallized glass is produced. And in this manufacturing method, ZnS or ZnO and sulfur are used as additives. And after forming by vitrification, a hard porcelain is produced by crystallization with a special heat treatment having performed.

Consequently, by the said method, a product, which satisfies whiteness, translucency and mechanical strength respectively in the same manner as the pyroceram glass ceramics, could be obtained, however, comparing it with the hard porcelain product of the present invention or of the generally well-known products, the said product is still very expensive even though it is said that it is cheap when compared with Pyroceram.

Consequently, the glass ceramics according to the said manufacturing method could be employed, as its special purposes, for radome materials, fireproof and anticorrosion materials for physico-chemical and chemical industries and the like, however, it could not be employed at all for general tablewares unless we should ignore its expensive cost as well as its poor aesthetic feeling. Moreover, it requires some special treatments in its manufacturing, therefore, it has such drawbacks that its manufacturing is troublesome and, eventually, becomes expensive for the ordinary hard porcelain manufacturing process. The glass ceramics are prepared by first melting the raw materials (compounds of glass ceramics materials and nucleating agents), and, then, depositing crystals by a heat treatment after forming. Therefore, it could not be considered in any way it is the same the ordinary hard porcelain. Consequently, the said product is totally different from that of the present invention in view of its composition. This difference could be fully understood when an electron micrograph of FIG. 3 showing an enlarged sectional view of a product in the present invention and that of FIG. 4 showing the same of a product of the well-known glass ceramics are compared with each other.

Namely, many big, small and uneven crystalline phases appear remarkably in the present invention, however, on the contrary, no unevenness could be recognized in the ceramics crystallines which appear in an extremely minute and flat texture because the original substance is a fused compound of glass materials.

And, if the manufacturing methods were to be compared, the manufacturing method in the present invention is, as shown on Flow Chart in FIG. 1, the same as that for production of the former hard porcelain. However, a hard porcelain body of high white translucency and high strength, which could not be formerly produced, could be obtained, by the present method. In contrast, the manufacturing method for the glass ceramics is, as shown on Flow Chart in FIG. 2, not only totally different from that of the present invention, but it also had to depend on some special process different from the well-known manufacturing method for a hard porcelain.

Also, for forming a great amount of crystals of cordierite, enstatite and forsterite in a hard porcelain body, cordierite porcelains, steatite porcelains and forsterite porcelains have respectively been known formerly. However, since the cordierite porcelain was a hard porcelain body formed with a great amount of cordierite

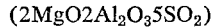

(2MgO2Al$_2$O$_3$5SO$_2$)

in the green body after firing the mixture of talc 43%, corundium 22% and plastic clay 35%, it had such drawbacks as a short firing temperature range, no translucency and, moreover, no suitable glaze owning to its extremely small expansion coefficient. The steatite porcelain employs talc (above 80%) as a chief ingredient for its materials and kaolin could not be used. It is utilized for electric insulators of high frequencies, but it could not be used for daily tablewares. The reason for the foregoing is that the firing temperature range is very short, the firing is difficult and, also, it has a poor white translucency. The forsterite porcelain, being a hard porcelain of the same system as that of the steatite, is produced by adding MgO to talc or by adding MgCO$_3$ or MgO to a green body of steatite and since its chief ingredient is forsterite (2MgOSiO$_2$), its thermal expansion coefficient is great and it has poor resistance to thermal shock. Moreover, the forsterite porcelain has a great expansion coefficient (same as that of titanium metals) which is the same value as that of Fe-Ni alloys, therefore, it is utilized for vacuum tube ceramics, however, it could not be employed with a hard porcelain glaze for tablewares because of its expansion coefficient being considerably different.

SUMMARY OF INVENTION

The present invention provides a hard porcelain body of high white translucency and high mechanical strength with entirely different materials and manufacturing which does not depend on the manufacturing method and materials employed for producing glass ceramics, and moreover, the hard porcelain body could be produced at the approximately same low cost as that of the well-known hard porcelain body and, moreover, could be produced by a manufacturing process which has not any difference specially from that of the well-known hard porcelain body.

The features of the present invention chiefly lies in utlizing for a different plastic green body from that of the formerly well-known hard porcelain and, if the present invention can be explained generally starting with the mixing of materials for a plastic green body. More specifically SiO$_2$ is added to MgO or Mg compounds and the mixture pulverized to a grain diameter under 10$\mu$ and, after adding a mineralizer, a sintered compound of protoenstatite, clinoenstatite, forsterite and SiO$_2$ is formed by a high temperature firing and, then, employing the said sintered compound as a chief ingredient, plastic clay and other additives are added thereto and a plastic green body is made after pulverization. Then the said plastic green body is subjected to the following well-known steps, that is, the process of screening, ferrofilter, forming, drying, finishing, biscuit firing, glazing and glost firing after which, a hard porcelain body of high white translucency and high strength is finally obtained by depositing in a great quantity of fine crystalline phases of cordierite, enstatite and forsterite in a hard porcelain product.

It is an object of the present invention to obtain a hard porcelain body having an extremely high degree of whiteness, high translucency and high mechanical strength required for materials which could be used for tablewares.

Another object is to obtain a hard porcelain body of high white translucency and high mechanical strength wherein, having prepared a sintered compound with protoenstatite, clinoenstatite, forsterite and SiO$_2$, plastic clay is added thereto and a plastic green body is made after pulverization and, then, after forming under a normal temperature by adding water, a great amount of fine crystals of the foregoing various minerals is deposited by sintering the plastic green body at a high temperature firing.

A further object is to obtain a hard porcelain body of high white translucency and high mechanical strength wherein, having SiO$_2$ added to MgO or Mg compounds and pulverizing the same, a sintered compound is formed under a high temperature firing and, then, plastic clay and additives are mixed therewith and a plastic green body is made after pulverizing again and, finally, after kneading with water and forming under a normal temperature, a great amount of fine crystals is deposited by firing under the melting point.

A still further object is to promote translucency by adding accelerators for sintering such as zinc oxide and the like to the foregoing clay.

A still another object is to obtain a hard porcelain body superior in whiteness and translucency wherein, having adopted the oridinary manufacturing process for a hard porcelain, a great quantity of fine crystalline phases is either retained or deposited on a hard porcelain body by means of technical improvements for mixing and firing a plastic green body, for uniformally distributing homogeneous structure and, also, for giving mechanical strength.

From the foregoing other purposes and the features of the present invention shall be evident in details to persons skilled in its art by referring, according to the present invention, its practical embodiments and accompanying drawings as shown below in connection with a hard porcelain body of high white translucency and high mechanical strength for which MgO or Mg compounds is utilized.

Figure 3:

The photograph in FIG. 3 shows a sectional view, magnified 3,000 times by an electron micrograph, of a hard porcelain body product according to the present invention and it is treated with hydrofluoric acid to show its crystal grains.

Figure 4:
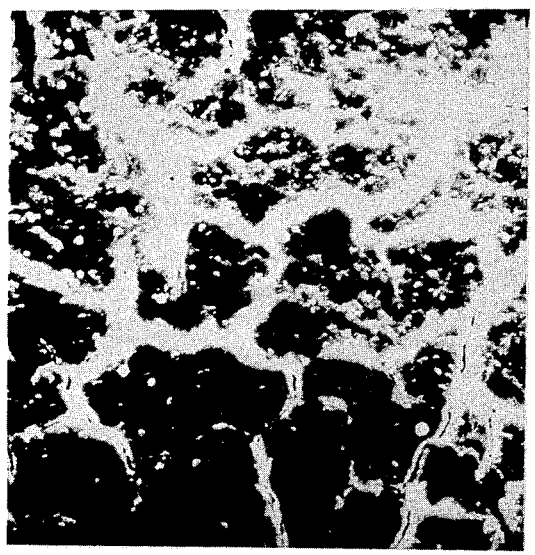

The photograph in FIG. 4 shows a sectional view, magnified 3,00 times by an electron micrograph, of the well-known glass ceramics product and it is also treated with hydrofluoric acid to show its crystals.

DETAILED DESCRIPTION FOR INVENTION

Figure 1:
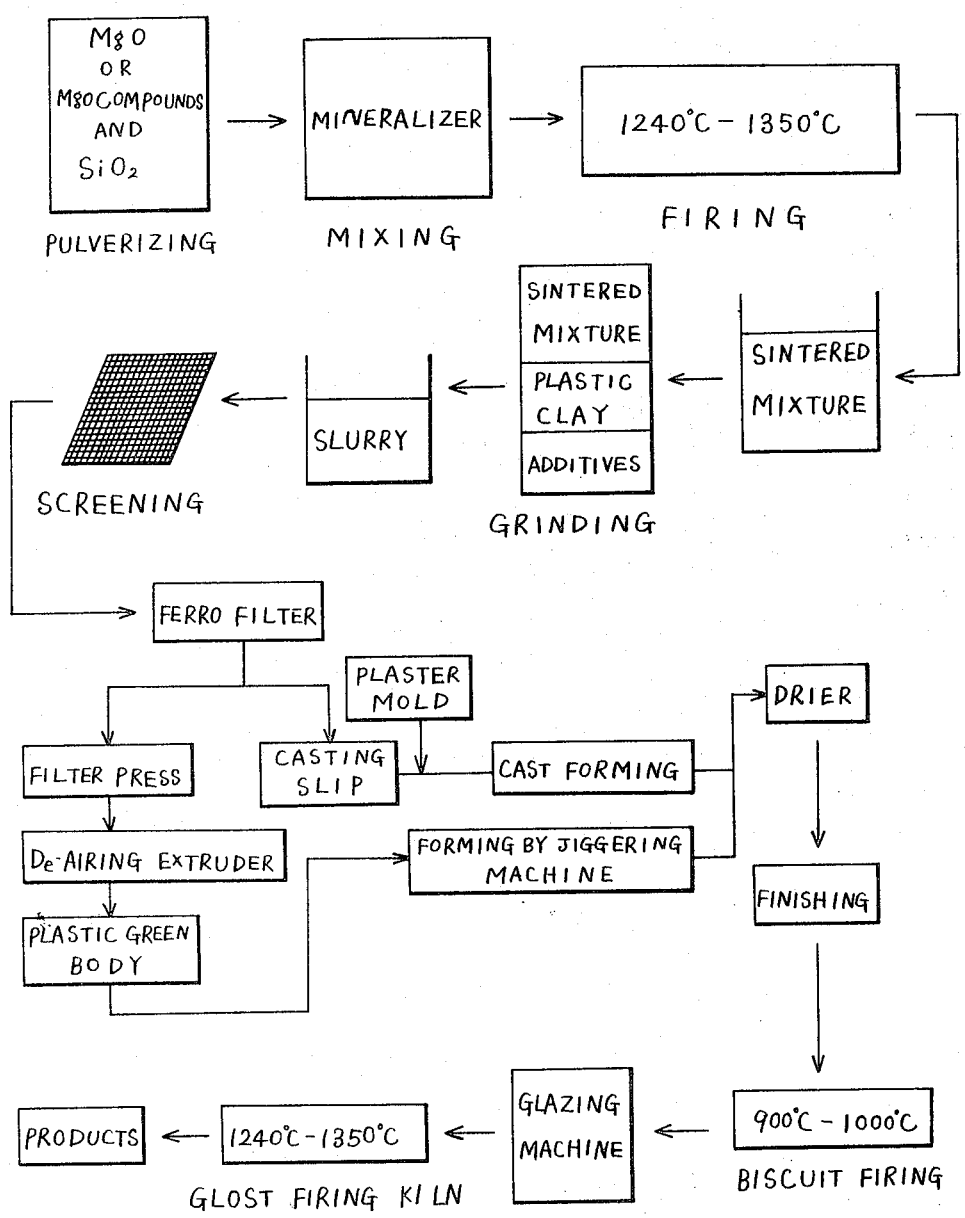
FIG. 1 generally shows a manufacturing process when the working of the present invention takes place.
Figure 2:
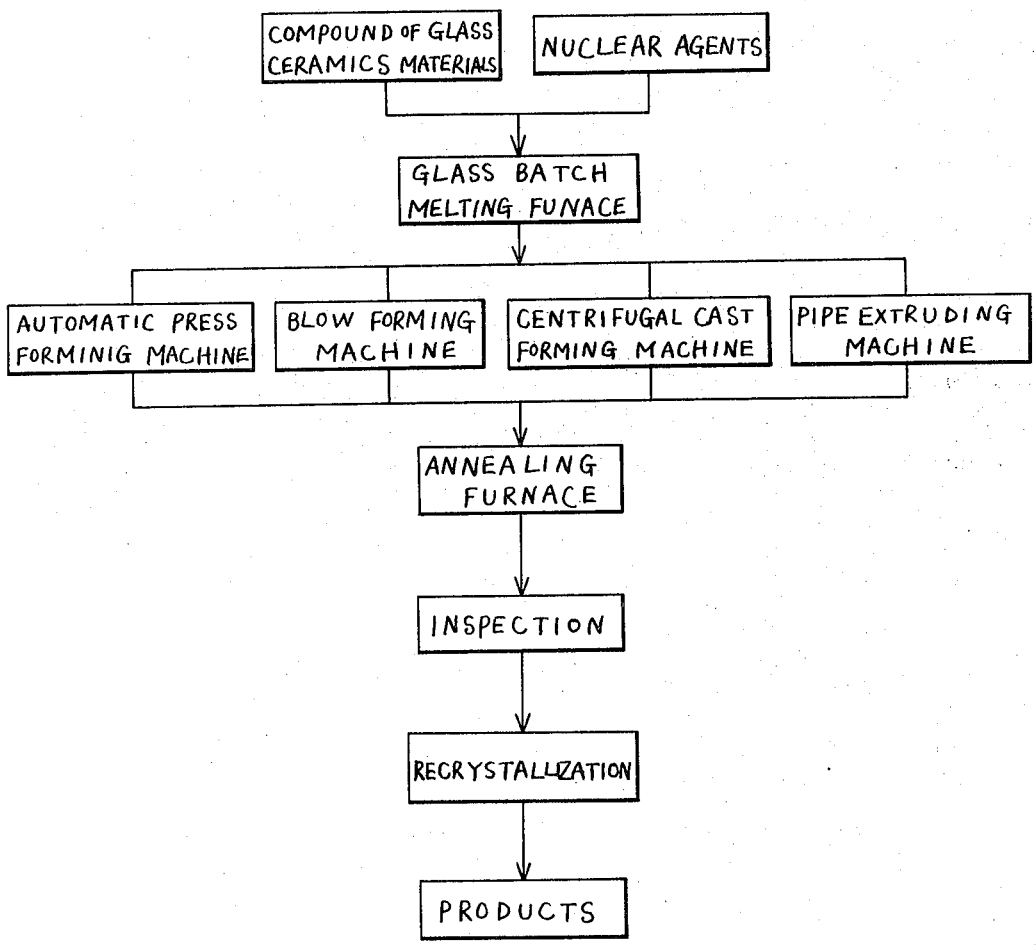
FIG. 2 generally shows a manufacturing process for the well-known glass ceramics.

Based on the Flow Chart for the process in FIG. 1 a hard porcelain body and its manufacturing method according to the present invention shall be explained.

Firstly, concerning the mixing of materials for a plastic green body employed in the present invention, if the amount of MgO or Mg compounds, such as magnesite, dolomite, magnesium hydroxide and the like, and SiO$_2$, which grain sizes are under 10$\mu$ respectively, is less than 80% of the tolal amount for the content ratio, a poor workability would be resulted, therefore, pulverization should be performed so that the amount more than 80% would be under 10$\mu$.

In this case, having added SiO$_2$ to the foregoing in the ratio of Mg:SiO$_2$=40:60 by converting the mole ratio into the weight ratio and, further, added, as mineralizers, 2%–3% of one kind or more than two kinds of LiCO$_3$, BaCO$_3$ and petalite (Li$_2$O, Al$_2$O$_3$, 8SiO$_2$) respectively and, after sufficiently mixing and putting into a sagger, a firing shall be performed passing through a tunnel kiln of a high temperature of 1,240° C.–1,350° C. for 36 hours so as to form a sintered compound of protoenstatite, clinoenstatite, forsterite and SiO$_2$. In this case the firing is, of course, not limited only by a tunnel kiln, but other well-known method could be allowable and it is natural that a firing temperature is lower than 1,240° C., a formation of crystals by materials would be inferior and translucency of a hard porcelain body becomes poor and, on the other hand, if the temperature is higher than 1,350° C., the strength of the hard porcelain body becomes poor due to a decrease in the amount of crystal formation, therefore, it is desirous to fire in the range of 1,240° C.–1,350° C. as stated above.

Employing the sintered compound obtained thus as a chief ingredient, e.g. ball clay, Gaerome clay, Murakami clay, kaolin, and additives such as feldspar, alumina, zinc oxide and the like are added thereto for increasing strength and plasticity of a green body. These additives are to promote the sintering of a hard porcelain body, accelerate the depositing of crystals and improve translucency.

It is advisable to have the mixing proportions of percentage for these substances as shown in the following Table 1.

TABLE 1

| | Weight percent | | |
|---|---|---|---|
| Practical embodiment | (1) | (2) | (3) |
| Sintered compound of protoenstatite, clinoenstatite, forsterite and $SiO_2$ | 54 | 62 | 67 |
| Gaerome clay | 15 | 18 | 10 |
| Kaolin | 12 | 6 | 7 |
| Feldspar | | 2 | 3 |
| Murakami clay | 8 | 9 | 10 |
| Alumina | 6 | | |

Next, the materials for a plastic green body prepared according to Table 1 shall be pulverized as fine as possible by performing a 50% water charge in order to lengthen a firing temperature range in a ball mill and, by making the grain size under 10μ, a slurry is obtained so as to contain, as a whole, more than 80% of grains under 10μ. Then, for a preliminary treatment for the plastic green body, the slurry is taken out of the ball mill to be screened through 200–250 mesh screen and iron which is mingled in the slurry and passed through the screen shall be excluded by an electromagnet such as a ferro-filter and the like. After this, a formed article is made by jiggering or casting of the ordinary method under the normal temperature and pressure and, then, the formed article is dried in a dryer.

Consequently, the forming in a molten condition into a glass form after cooling once, the re-heating and the annealing for crystallization as required in the case of a glass ceramics are entirely unnecessary. And, after drying the formed article, a biscuit firing is carried out at the temperature of 900° C.–1,000° C., then, a glazing is performed. In the foregoing process it is better to have a glaze which chemical composition consists of $SiO_2$ 65–75 wt. percent, $Al_2O_3$ 10–20 wt. percent, CaO or MgO or its compounds 4–8 wt. percent and $K^2O$ or $Na_2O$ or its compounds 5–8 wt. percent. A glaze mixture shall be mixed with much water and, then, powdered. The powdered substance shall be passed through a 5,400–10,000 holes/cm.$^2$ screen to screen out larger residues and the specific gravity shall be kept at 1.60–1.70 by regulating a water content of a glaze slip. A glazing work shall be done by dipping (a method for glazing by inserting articles into glaze slip) and, after finishing, a glost firing shall be undertaken subsequent to a packing into a sagger. For this case it is desirous to have a glost firing temperature within the range of 1,240° C.–1,350° C. which is the same as for the obtaining of the sintered compound. Thus, by depositing in a great amount of fine crystalline phases of cordierite, enstatite and forsterite in a hard porcelain body while in glost firing, a hard porcelain body of high white translucency and high mechanical strength shall be obtained.

Further, for a flat type article like a dish, a slurry is dehydrated by a filter press so as to form a cake and, then, run through a vacuum extruder and, at the same time when air is taken out, a water content is minutely adjusted so as to exist a uniformity of the water content considering what type of a forming machine is being used, and a forming is performed after making it a plastic green body.

On the other hand, for a cast forming for an article like a pot which is not of a flat type, a pH of water content in a slurry is adjusted and, by dissolving a deflocculant, the so-called casting slip shall be made. Furthermore, with a rise in a firing temperature, enstatite, cordierite and forsterite are deposited from an intermediate phase formed by sintering and finally the total amount became more than 60%.

The features of the hard porcelain body formed and fired from the green body in this way could be represented by a X-ray diffraction as shown in Table 2. Namely, fine crystalline phases of enstatite, cordierite and forsterite could be formed in a great amount deposited or retained in the structure of the hard porcelain body. Also, it is evident that the refractoriness of the said hard porcelain body was within the range of Seger cone 9–15 as measured afterwards.

TABLE 2

| Interplanar spacing d (A.) | $1/I_0$ | Crystals |
|---|---|---|
| 8.59 | 70 | Cor. |
| 6.37 | W | E |
| 4.90 | 14 | Cor. |
| 4.70 | 7 | Cor. |
| 4.40 | 5 | E |
| 4.10 | 25 | Cor. |
| 3.39 | 24 | Cor. |
| 3.24 | 16 | E |
| 3.19 | 100 | E |
| 3.14 | 32 | Cor. |
| 3.04 | 37 | Cor. |
| 2.91 | 37 | E |
| 2.80 | W | W |
| 2.73 | 18 | E |
| 2.64 | 10 | Cor. |
| 2.557 | 23 | E |
| 2.468 | 8 | E |
| 2.444 | 5 | Cor. |
| 2.338 | Trace | Cor. |
| 2.304 | 13 | E |
| 2.238 | 7 | Cor. |

NOTE.—W=Weak. Cor.=Cordierite. E=Enstatite.

The condition for the line of diffraction as shown in Table 2 could be represented by the following formula.

$$2d\sin\theta = n\lambda$$

$d$: Interplanar spacing of crystals
$\theta$: Angle of diffraction
$\lambda$: Wave-length of X-ray
$n$: Degree of reflection The following results are, as shown in Table 3, obtained after comparing the value measured for mechanical strength, whiteness, translucency and so forth of the present invention for the hard porcelain product with that of the conventional hard porcelain product of feldspar.

TABLE 3

| | Porcelain body of this invention | | | |
|---|---|---|---|---|
| | Practical embodiment (1) | Practical embodiment (2) | Practical embodiment (3) | Conventional feldspar porcelain |
| Bending strength (no glaze), kg./cm.$^2$ | 1,400–1,700 | 1,700–2,000 | 1,500–1,800 | 600–800. |
| Linear thermal expansion coefficient, 800° C. | 4.5–4.7×10$^{-6}$ | 5.5–6.0×10$^{-6}$ | 6.0–7.0×10$^{-6}$ | 4.5–5.5×10$^{-6}$. |
| Color: | | | | |
| L | 90–91 | 91–93 | 91–93 | 80–85. |
| a | −1 | −2 | −2 to −3 | −3 to −5. |
| b | 1.5 | 2 | 2–3 | 1–2. |
| Translucency, percent (thickness) | 0.15 (4.5 m/m) | 0.25 (4.5 m/m) | 0.35 (4.5 m/m) | 0.05–0.08 (4.5 m/m). |
| Density, g./cc. | 2.4 | 2.5 | 2.6 | 2.3. |
| Chip strength, kg.-cm | 1.8–2.0 | 2.0–2.3 | 2.0 | 0.8. |
| Impact strength, kg.-cm | 3.0–4.0 | 4.0–5.0 | 4.0 | 1.5. |
| Heat resisting impact, ° C | 220 | 220 | 210 | 200. |
| Water absorption | None | None | None | None. |
| Mineral amount in green body | Cordierite, enstatite much. | Cordierite, enstatite much. | Enstatite, cordierite much. | Mullite, quartz little. |

It is apparent from the result of the above measurements that the hard porcelain product obtained according to the method in the present invention is, when compared with the conventional hard porcelain product of feldspar, remarkably superior to the latter in every respect as far as its mechanical strength, whiteness, translucency and so forth are concerned.

The examples for the mixing as shown in the foregoing practical embodiments are only a part of examples for chemical compositions described in the foregoings, therefore, other various ways of mixings could, of course, be considered. Further, zinc oxide which is employed herein is added for promoting the sintering and for accelerating the depositing of crystals and, also, for promoting transluency. And lithium fluoride, barium carbonate, calcium carbonate, zirconium oxide, etc. could be replaced with zinc oxide or these substances could be used jointly with zinc oxide.

Of course, not limited by these practical embodiments, the same result could be accomplished even in the case wherein $SiO_2$ is added to one kind or more than two kinds of MgO or Mg compounds previously described and mineralizer is also added thereto and, then, after pulverizing a plastic green body added with plastic clay is employed to a substance which rendered a sintered compound consisting of protoenstatite, clinoenstatite, cordierite, forsterite and $SiO_2$ formed by sintering at a high temperature.

The hard porcelain product obtained by the method of this invention has, as evident in Table 3, an exceedingly great mechanical strength, extremely high degree of whiteness and very high translucency, for instance, its strength for resisting against bending is about three times as much as that of a conventional feldspar porcelain and its translucency is several times as much also. Moreover, the method of this invention is not greatly different from the manufacturing process performed at present in the pottery industry (chiefly in the tablewares manufacturing industry) and its manufacturing could be easily performed by the entirely same method as the conventional one and any special techniques in the manufacturing as needed for a special kind of a hard porcelain, which is generally thought to be superior in its mechanical strength and physical natures, are not required and, moreover, having no other various difficult problems in the manufacturing cost, raw materials and so forth, there exist entirely no restrictions as far as its manufacturing is concerned. Furthermore, when compared with a special type of a hard porcelain, the green body for the present product according to the method of this invention is no less better than that of the foregoing special one in its mechanical and physical natures and, being chiefly suitable to a hard porcelain product for tablewares, it has an extremely great effectiveness.

What is claimed is:

1. In a method for manufacturing a hard porcelain article of high white translucency and high strength which comprises:

forming a plastic green body, firing to form a biscuit, glazing and glost firing said biscuit, the improvement which comprises forming said biscuit by:

a. pulverizing MgO or an Mg compound and $SiO_2$ so that more than 80% of the resultant mixture has a grain size of under $10\mu$, the ratio of MgO or Mg compound to $SiO_2$ being 40 parts by weight, as MgO, to 60 parts by weight $SiO_2$, b. mixing the mixture of step a with 2 to 3% of $Li_2CO_3$, $BaCO_3$ or petalite as a mineralizer, c. forming a sintered mixture of protoenstatite, clinoenstatite, forsterite and $SiO_2$ by sintering the mixture of step b at 1240° to 1350° C., d. mixing
   (1) 10 to 18 wt. percent Gaerome clay
   (2) 6 to 12 wt. percent Kaolin
   (3) 0 to 3 wt. percent Feldspar
   (4) 8 to 10 wt. percent Murakami clay
   (5) 0 to 6 wt. percent Alumina
   (6) 54 to 67 wt. percent of the sintered mixture of step c, e. forming a slurry with the mixture of step d and water and milling said slurry to pulverize said mixture so that more than 80% of the particles thereof are under $10\mu$, f. forming a plastic green body and drying said body to remove water therefrom, and g. firing said body at 900–1000° C. to produce said biscuit.

2. A method of manufacturing a white hard porcelain article as defined to claim 1 further including adding as an acceleration to step d of sintering and mineralization the compound one or more kinds of zinc oxide, lithium fluoride, barium carbonate, calcium carbonate and zirconium.

3. A method of manufacturing a white hard porcelain article as defined in claim 1 wherein the glazing is done with a high temperature fired glaze which contains 65%–75% by weight of $SiO_2$, 10%–10% by weight of $Al_2O_3$, 4%–8% by weight of a material taken from the group consisting of CaO and MgO, and 4%–8% by weight of a material taken from the group of $K_2O$ and $Na_2O$.

4. A method according to claim 2 wherein zinc oxide is added to the mixture of step d as a sintering accelerator.

References Cited
UNITED STATES PATENTS

| | | | |
|---|---|---|---|
| 3,170,780 | 2/1965 | Takehara et al. | 65—33 XR |
| 3,480,452 | 11/1969 | Fleischner et al. | 65—33 XR |
| 3,423,217 | 1/1969 | Blaha | 65—33 XR |
| 3,499,787 | 3/1970 | Inoue et al. | 65—33 XR |
| 3,650,817 | 3/1972 | Motoyuki | 65—33 XR |
| 3,384,508 | 5/1968 | Bopp et al. | 65—60 XR |

S. LEON BASHORE, Primary Examiner

F. W. MIGA, Assistant Examiner

U.S. Cl. X.R.

65—33, 60, 134; 106—39.7; 117—118